United States Patent
Anderson (10) Patent No.: US 7,191,957 B2
(45) Date of Patent: Mar. 20, 2007

(54) PERISTALTIC MACHINE FOR DEPOSITING VISCOUS MATERIALS

(76) Inventor: Joseph Anderson, 10036 Belding Rd., Rockford, MI (US) 49341

( * ) Notice: Subject to any disclaimer, the term of this patent is extended or adjusted under 35 U.S.C. 154(b) by 4 days.

(21) Appl. No.: 10/629,158

(22) Filed: Jul. 29, 2003

(65) Prior Publication Data

US 2004/0022656 A1  Feb. 5, 2004

Related U.S. Application Data

(63) Continuation of application No. PCT/US02/02425, filed on Jan. 30, 2002.

(60) Provisional application No. 60/264,906, filed on Jan. 30, 2001.

(51) Int. Cl.
*B05B 1/08* (2006.01)

(52) U.S. Cl. .................. 239/99; 239/119; 239/327; 239/379; 239/602; 222/214; 417/476; 417/477.3; 417/477.6; 417/477.12

(58) Field of Classification Search .................. 239/99, 239/119, 302, 327, 379, 602, DIG. 12; 222/214, 222/571; 417/474, 475, 476, 477.1, 477.3, 417/477.6, 477.12

See application file for complete search history.

(56) References Cited

U.S. PATENT DOCUMENTS

| | | | | |
|---|---|---|---|---|
| 2,703,256 A | * | 3/1955 | Mascaro | ................. 417/477.12 |
| 3,750,908 A | * | 8/1973 | Bauerlein et al. | ........... 222/214 |
| 3,877,609 A | | 4/1975 | Cullis | |
| 4,702,679 A | | 10/1987 | Malbec | |
| 4,878,622 A | | 11/1989 | Jamison et al. | |
| 5,193,750 A | * | 3/1993 | LaMontagne et al. | ... 417/477.3 |
| 5,380,172 A | | 1/1995 | Ulbing | |
| 5,597,094 A | * | 1/1997 | Vilbert | ....................... 222/214 |
| 5,645,195 A | | 7/1997 | Belshaw et al. | |
| 5,846,061 A | | 12/1998 | Ledebuhr et al. | |
| 5,941,696 A | | 8/1999 | Fenstermacher et al. | |
| 5,980,490 A | | 11/1999 | Tsoukalis | |
| 6,016,935 A | | 1/2000 | Huegerich et al. | |
| 6,035,904 A | | 3/2000 | Beau et al. | |
| 6,142,340 A | | 11/2000 | Watanabe et al. | |

* cited by examiner

*Primary Examiner*—Steven J. Ganey
(74) *Attorney, Agent, or Firm*—Todd E. Marlette (57) ABSTRACT

A peristaltic depositing machine includes a hopper to store viscous material. A flexibly deformable tubing section is connected to the hopper for receiving the viscous material. A pair of rollers cooperate to compress tubing section and thereafter move forwardly along the tubing section such that the viscous material is forwardly propagated. A manifold is connected between the hopper and the tubing section to transmit the viscous material there between. A flow control unit is connected to a portion of the tubing section forward of the pair of rollers. The flow control unit alternately constricts and unconstricts the portion of the tubing section in synchronism with the forward movement by the pair of rollers. A nozzle is connected to an output end of said tubing section to shape the viscous material upon output. A carriage is also connected to an output end of the tubing section and moves about a predetermined travel path to thereby direct an output location of the viscous material.

22 Claims, 6 Drawing Sheets

PERISTALTIC MACHINE FOR DEPOSITING VISCOUS MATERIALS

CROSS REFERENCE TO RELATED APPLICATIONS

This application is a continuation of International Application No. PCT/US02/02425 filed Jan. 30, 2002, which claims the benefit of Provisional Application No. 60/264,906 filed Jan. 30, 2001.

BACKGROUND OF THE INVENTION

1. Field of the Invention

The present invention relates to the art of machines for high speed depositing of viscous flowable food materials. More particularly, the present invention relates to depositing machines having a peristaltic device for depositing viscous materials in repetitive singular quantities.

2. Description of the Related Art

Many prior devices have been developed for the transportation and control of viscous flowable materials. For example, Beshaw, et al., U.S. Pat. No. 5,645,195 sets forth a dough and batter dispenser having a hopper and rotatable valve unit to dispense dough and batter in a controlled manner. According to Beshaw, the dough maintains direct contact with a number of intricate moving parts. The direct contact with moving parts presents a significant burden, inter alia, for cleaning of the machine and for maintaining sanitary conditions.

A number of additional devices have been developed to control flowable materials through the elastic deformation of a flexible tube. Malbec, U.S. Pat. No. 4,702,679 relates to a peristaltic pump wherein a plurality of rollers cooperate to continuously and repetitively deform sections of a flexible tube. The rollers rotate about a fixed shaft to alternately deform sections of the flexible tube to and provide a pumping action to the interior liquid. The action of Malbec provides a continuous pumping action for non-viscous liquids, such as windshield wiper fluid. Ledebuhr, et al., U.S. Pat. No. 5,846,061 relates to a peristaltic metering pump for dispensing liquid materials. A flexible tube encircles a rotor assembly having three rollers. As the rollers rotate about a fixed pin, the tube flexes to provide a pumping action to the liquid. Penstermacher, et al., U.S. Pat. No. 5,941,696 relates to a peristaltic pump having a plurality of flexible tubes that are repetitively deformed by six rotating rollers. Each of the rollers rotates with respect to a central stationary axis point. Huegerich, et al., U.S. Pat. No. 6,016,935 relates to a viscous food dispensing assembly incorporating a rotating pump head. A deformable tube encircles a portion of the rotating pump head and is repetitively deformed during rotation of the pump head.

As set forth above, prior peristaltic pumps incorporating rollers and flexible tubes generally deform the tubes through rotation of a plurality of rollers about an arcuate surface. However, the rotating action of the rollers is generally directed to a pumping action to force output of a material or a so-called metering action to control a rate of streaming output.

SUMMARY OF THE INVENTION

These and other features, objects, and benefits of the invention will be recognized by one having ordinary skill in the art and by those who practice the invention, from the specification, the claims, and the drawing figures.

A peristaltic depositing machine sequentially and repetitively outputs individual quantities of viscous material onto a movable sheet. The peristaltic depositing machine is also adjustable to vary an output quantity of viscous material. Reverse motion of viscous material within the depositing machine is produced at the end of each deposit cycle to break off individual deposits of material. The peristaltic machine is easily disassembled to facilitate cleaning.

A peristaltic machine includes a hopper to store viscous material. A flexibly deformable tubing section is connected to the hopper for receiving the viscous material. A pair of rollers then cooperating to compress the tubing section and, thereafter, move forwardly along the tubing section such that the viscous material is forwardly propagated. A manifold is connected between the hopper and the tubing section to transmit the viscous material there between. A flow control unit is also connected to a portion of the tubing section forward of the pair of rollers. The flow control unit alternately constricts and unconstricts the portion of the tubing section in synchronism with the forward movement by the pair of rollers. A nozzle is connected to an output end of said tubing section to shape the viscous material upon output. A carriage is connected to an output end of the tubing section, wherein the carriage is controlled to move about a predetermined travel path to thereby direct an output location of the viscous material. The predetermined travel path of the carriage is executed in synchronism with the forward movement by the plurality of rollers. A plurality of additional flexibly deformable tubing sections are connected to the manifold for receiving the viscous material. The pair of rollers cooperate to simultaneously compress all tubing sections and, thereafter to move forwardly along each of the tubing sections to propagate the viscous material.

DETAILED DESCRIPTION OF THE PREFERRED EMBODIMENTS

A preferred embodiment of a peristaltic machine for depositing viscous materials according to the invention is generally shown in the drawing figures and discussed below.

Figure 1:
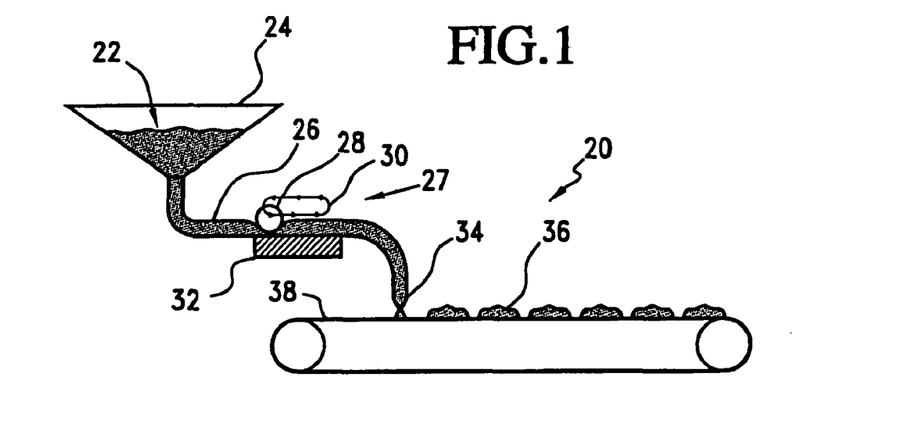
FIG. 1 is a schematic view of a viscous material depositing machine according to an embodiment of the present invention.

FIG. 1 is a schematic view of a viscous material depositing machine 20 according to an embodiment of the present invention. A viscous material 22 is continuously placed into hopper 24 and is thereby fed into flexible tubing 26. Roller 28 follows travel path 30 to continuously deform flexible tubing 26 with respect to travel platen 32. Viscous material 22 is then output from nozzle 34 as individual deposits 36 onto movable sheet 38 in accordance with travel path 30.

During a peristaltic cycle of depositing machine 20, roller 28 provides a number of operations on the viscous material 22. At the beginning of the peristaltic cycle of travel path 30, peristaltic unit 27 compresses flexible tubing 26 by way of downward contact of roller 28 with travel platen 32. Material 22 in tubing 26 then exerts pressure in both forward and rearward directions such that a small portion of material begins to be output from nozzle 34. Roller 28 next begins to travel forward in a direction toward nozzle 34, while deforming the tubing 26 with respect to travel platen 32. This action forces a deposit of material out of nozzle 34 and onto movable sheet 38. Roller 28 then continues in a forward direction toward nozzle 34 along travel path 30. At the end of forward travel, roller 28 is moved upwardly with respect to travel platen 32. Tubing 26 then elastically returns to its original, non-deformed state. As tubing 26 returns to its non-deformed state, the enclosed material 22 within the tubing is subjected to a suction force, which thereby draws more material from hoper 24 and also draws some material in a reverse direction from nozzle 24. The reverse movement of material at nozzle 24 provides a break in the material, which thereby separates the material into individual deposits 36.

Hopper 24 is an open, gravity type hopper having vertical or slanted sides, thereby encouraging material flow downward into connected tubing 26. Tubing 26 is flexible to allow repeated compression to the point of closure of the inner tubing passage. Tubing materials include PVC, vinyl, silicone, and polyurethane. A preferred tubing material is norprene A60F, manufactured by Saint-Gobain Performance Plastics of Wayne, N.J. Nozzle 34 provides an orifice of a size and shape appropriate for a desired material deposit. As discussed in further detail below, a plurality of different nozzle sizes may be used and the amount of travel of roller 28 may be adjusted depending upon the type of material and the quantity of a desired deposit.

Peristaltic unit 27 provides a traveling constriction of tubing 26 by way of roller 28. At the beginning of a peristaltic cycle, roller 28 is pressed towards a centerline of tubing 26 such that the tubing is constricted towards platen 32. In this position, which by adjustment can provide a constriction or a complete closure of an interior tubing passage, the roller 28 is then made to travel in a direction toward nozzle 34. This forces material 22 to flow in wave-like fashion towards the nozzle 34. At the same time, natural expansion of the tubing 26 behind roller 28 causes suction, thereby resulting in more material being drawn from hopper 24. At or near the end of the forward stroke of roller 28, roller 28 is released from compression of tubing 26, and returned to its original position along illustrated travel path 30. During return of roller 28 in the peristaltic cycle, material 22 rests inside tubing 26. According to an alternative embodiment, roller 28 remains stationary while the platen 32 follows a contoured travel path (not shown).

Figure 2:
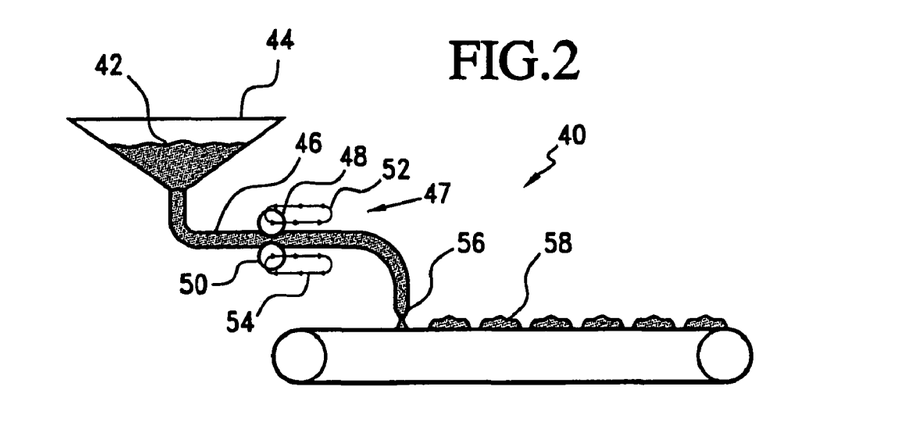
FIG. 2 is a schematic view of a viscous material depositing machine according to another embodiment of the present invention.

FIG. 2 is a schematic view of a viscous material depositing machine 40 according to a second embodiment of the present invention. Viscous material 42 is first input into hopper 44 and travels through flexible tubing 46. Peristaltic unit 47 then compresses flexible tubing 46 to thereby exert pressure on the enclosed material. As illustrated, a pair of rollers 48 and 50 cooperate to simultaneously compress tubing 46. Roller 48 then travels forward along travel path 52 toward nozzle 56. Roller 50 also travels forward along travel path 54 toward nozzle 56. The simultaneous compression and forward movement of rollers 48 and 50 force material 42 along tubing 46 and out through nozzle 56. As rollers 48 and 50 travel forward toward nozzle 46, the tubing immediately rearward of the rollers tends to expand, thereby causing suction of additional viscous material 42 from hopper 44 into the tubing 46. Rollers 48 and 50 are then removed from constriction of tubing 46 and return to their original position along respective travel paths 52 and 54. The action of the rollers along the respective travel paths forces output of individual material deposits 58 out from nozzle 56.

According to an alternate embodiment, roller 50 does not follow travel path 54, but merely moves forward toward nozzle 56 and rearward away from nozzle 56. In this embodiment, peristaltic action on the tubing 46 is provided by motion of roller 48 along travel path 52. This embodiment is preferable because the assembly required to move roller 50 in the forward and rearward directions is less complicated than the assembly required to move roller 50 along the illustrated travel path 54.

Figure 3:
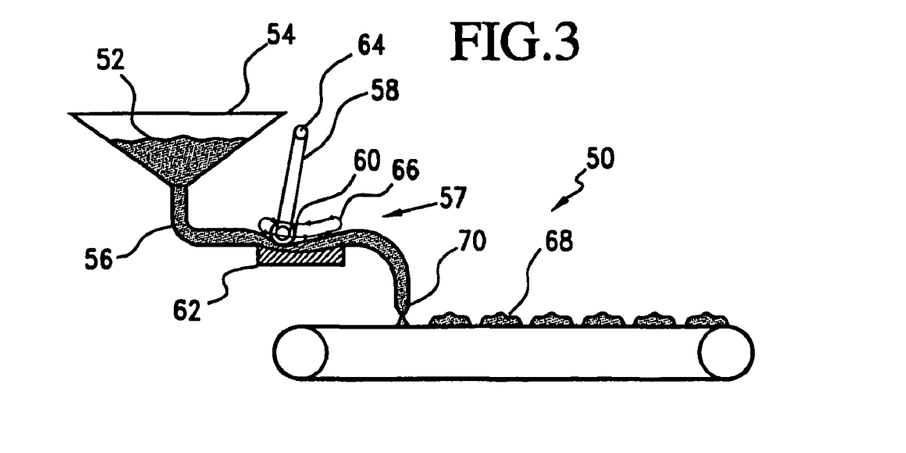
FIG. 3 is a schematic view of a viscous material depositing machine according to yet another embodiment of the present invention.

FIG. 3 is a schematic view of a viscous material depositing machine 50 according to yet another embodiment. Viscous material 52 is deposited into hopper 54 and travels into flexible tubing 56. According to this embodiment, peristaltic unit 57 is formed from swing lever 58, roller 60, and curved travel platen 62. In response to peristaltic action of peristaltic unit 57, material deposits 68 are sequentially ejected from nozzle 70. Swing lever 58 rotates with respect to pivot point 64 such that roller 60 travels about travel path 66. According to one embodiment of the invention, roller 60 moves upwardly with respect to swing lever 58 to complete a peristaltic cycle along travel path 66. According to an alternate embodiment, swing arm 58 itself is raised and lowered to effectuate movement of roller 60 along travel path 66.

The above embodiments are appropriate for use with flowable materials that are of a viscosity low enough to allow suction action from a hopper, while high enough to prevent gravity flow out from the nozzle during a roller return cycle. However, for materials having a lower viscosity, a second constriction unit placed between the peristaltic unit and the nozzle is preferably employed.

Figure 4:
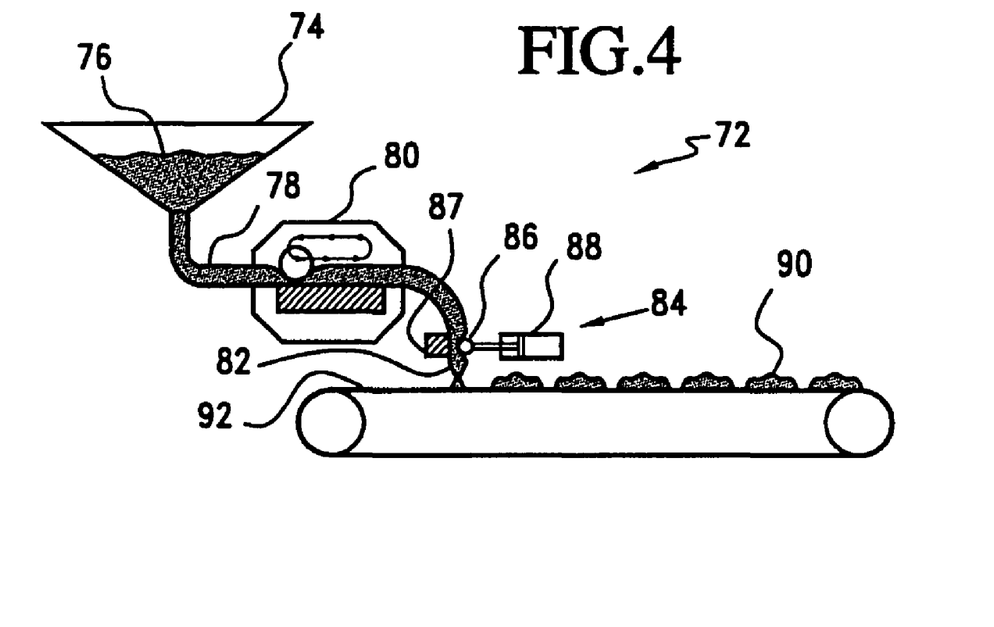
FIG. 4 is a schematic view of a viscous material depositing machine incorporating a backflow constriction unit.

FIG. 4 is a schematic view of viscous material depositing machine 72 for depositing individual material deposits 90. As illustrated, depositing machine 72 includes hopper 74 for receiving viscous material 76. Material 76 travels through flexible tubing 78 to peristaltic unit 80, for repetitive peristaltic action in a direction towards nozzle 82. Flow control unit 84 provides secondary constriction to tubing 78 to control output of lower viscosity materials. Flow control unit 84 includes flow bar 86, which is controlled to repetitively compress and decompress tubing 78 in response to actuation by cylinder 88. As illustrated, flow bar 86 compresses tubing 78 with respect to compression platen 87.

According to an embodiment, flow control unit 84 maintains partial constriction of tubing 78 while peristaltic unit 80 propagates material 76 out of nozzle 82. Natural expansion of tubing 78 during the peristaltic action draws material 76 into the tubing. When peristaltic unit 80 completes forward propagation of the material, flow control unit 84 also releases compression of tubing 78, thereby permitting elastic expansion of tubing 78. This elastic expansion of tubing 78, while material is not being propagated forward by peristaltic unit 80, draws material 76 backwards within tubing 78 in a reverse direction from nozzle 82. Accordingly, viscous material 76 cleanly breaks from the tip of nozzle 82 to define individual material deposits 90.

According to an alternate embodiment, flow control unit 84 complete constricts tubing 78 at the end of forward material motion by peristaltic unit 80, thereby halting primary and/or secondary flow of material 76 through flexible tubing 78.

Figure 5:
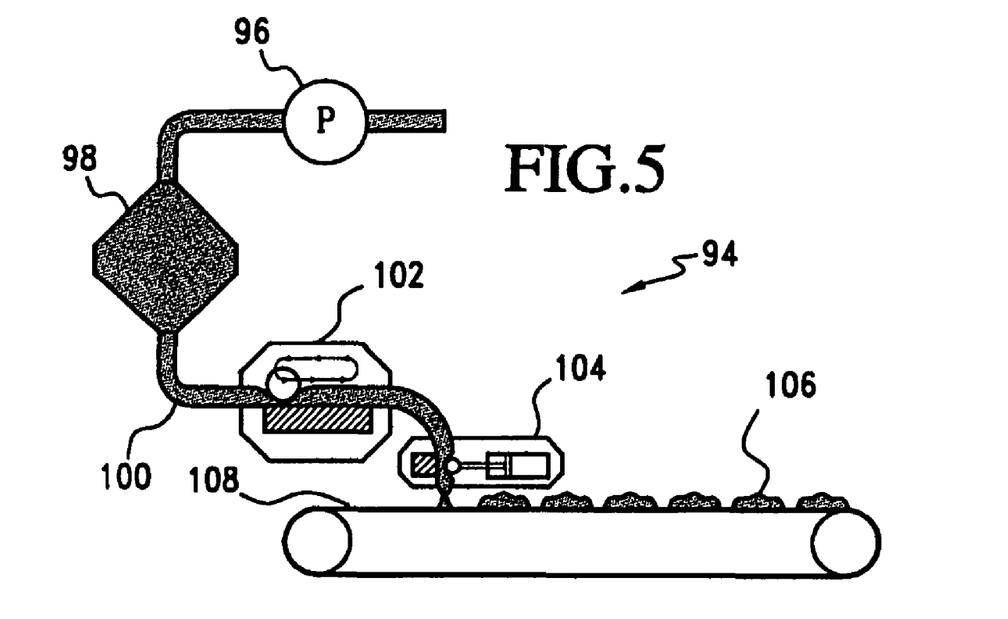
FIG. 5 is a schematic view of a viscous material depositing machine incorporating a backflow constriction unit in combination with a pump assembly.

FIG. 5 is a schematic view of material depositing machine 94 for depositing individual material deposits 106. Depositing machine 94 includes a main pump assembly 96 instead of a hopper to push pressurized material toward manifold unit 98. Manifold unit 98 supplies material to a plurality of separate pieces of flexible tubing. By way of example, flexible tubing 100 is connected to manifold unit 98, and is then fed through peristaltic unit 102 and flow control unit 104. Each piece of flexible tubing, exemplified by tubing 100, outputs individual material deposits 106 onto movable sheet 108. According to this embodiment, peristaltic unit 102 controls movement of the material within tubing 100. The pressure provided by pump assembly 96 is not high enough to force the material through the tubing until initiation of a subsequent peristaltic cycle by peristaltic unit 102. According to an embodiment of the invention, main pump assembly 96 cooperates with a hopper to provide pressurized material to tubing 100. Pump assembly 96 provides continuous pressure, by way of feed or forcing rolls, as commonly used in dough extruding machines. By way of example, an open hopper is mounted directly above one or a pair of feed rolls. The feed rolls then force dough into individual tubes through pressurized manifold 98. Alternatively, augers may be used to draw material from a hopper into pressurized manifold 98.

According to an embodiment of the invention, the roller or rollers in the above peristaltic units revolve as a consequence of friction contact with flexible tubing. In a more preferred embodiment, the rollers are driven by a motor at a rotational speed that results in a speed corresponding to the linear travel speed of the roller or rollers along the tubing in a direction of the nozzle. External drive of the rollers results in lowered stress on the tubing.

Operation of the above flow control units may seek to constrict the tubing by way of a roller. In a more preferred embodiment, the flow control units constrict the tubing by way of a rigid bar. The flow control units are preferably operated by an air or hydraulic cylinder. According to an alternate embodiment, the flow control units are operated by way of a servo motor.

The above schematic figures illustrate a single flexible tubing section to deliver viscous flowable material through a single nozzle. However, a single hopper or pump assembly is preferably connected to a plurality of flexible tubing sections through a manifold. A common peristaltic unit and common flow control unit simultaneously provide peristaltic action and constriction to all flexible tubing sections to control material flow with respect to a plurality of separate and corresponding nozzles. The peristaltic rollers, platen, and flow control unit members are of sufficient width to allow the plurality of flexible tubing sections to be disposed side by side, as set forth in greater detail below.

Figure 6:
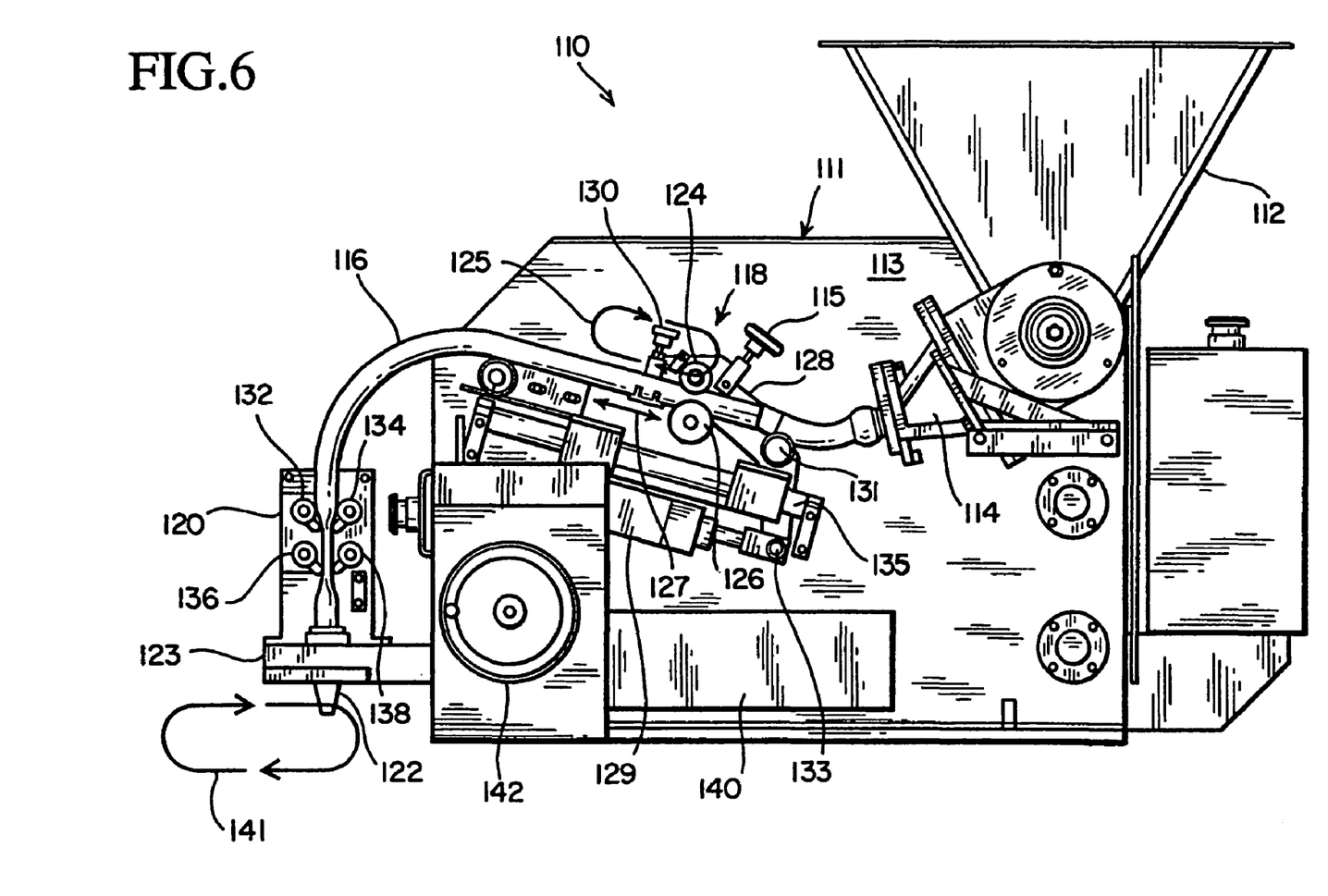
FIG. 6 is side sectional view of a viscous material depositing machine according to an embodiment of the present invention.

FIG. 6 is side sectional view of a viscous material depositing machine 110 according to an embodiment of the invention. Depositing machine 110 includes a body structure 111 supporting a hopper 112 for receiving viscous material and supporting a plurality of machine plates 113 for supporting machine components. Hopper 112 connects to manifold assembly 114, which in turn connects to a plurality of flexible tubing sections 116. Each of the plurality of tubing sections 116 are simultaneously constricted and released by peristaltic unit 118. After the viscous material is pushed through tubing sections 116 by peristaltic unit 118, the material flows through flow control unit 120. The material is finally discharged through a plurality of nozzles 122 that respectively connect to each of the flexible tubing sections 116. As illustrated, nozzles 122 and flow control unit 120 move simultaneously in the horizontal and vertical directions by way of movable carriage 123 about travel path 141.

Peristaltic unit 118 is powered by a servo motor (not shown) connected to rollers 124 and 126 by way of a plurality of belts (not shown). Peristaltic unit 118 includes primary roller 124 that travels along oval travel path 125 and secondary roller 126 that travels along linear travel path 127. Each of the rollers 124 and 126 are powered to rotate with a rotational speed synchronous with a linear travel speed along the respective travel paths. Primary roller 124 and secondary roller 126 cooperate to compress tubing sections 116 in a direction toward nozzles 122.

Primary roller 124 and secondary roller 126 follow linear slide shaft 135 in horizontal directions toward and away from nozzles 122. Movement of the rollers 124 and 126 along linear slide shaft 135 is controlled by a belt and pulley attachment to a servo motor (not shown). The servo motor sequentially changes direction to thereby effect motion of the rollers 124 and 126 in both linear directions with respect to linear slide shaft 135. However, primary roller 124 is further connected to dogleg member 128, such that primary roller 124 is controlled to follow the arcuate portions of travel path 125 by actuation of compression cylinder 129 about pivot points 131 and 133. Thus, primary roller 124 cooperates with secondary roller 126 to compresses tubing sections 116 in a direction toward nozzles 122. Then, primary roller 124 is lifted by dogleg member 128, and rollers 124 and 126 move in a reverse direction away from nozzles 122 with respect to linear slide shaft 135. The lifting of primary roller 124 allows elastic expansion of tubing sections 116 thereby drawing additional material from hopper 112. For the next peristaltic cycle, primary roller 124 compresses tubing 116 with respect to secondary roller 126 in response to actuation of compression cylinder 129. The amount of compression applied to tubing sections 116 is controlled by adjusting primary roller 124 with adjusting unit 130. Quick release knob 115 is provided to easily remove primary roller 124 for servicing and cleaning of the machine.

According to the illustrated embodiment of FIG. 6, flow control unit 120 includes a first pair of constriction arms, 132 and 134, which function as a flow control gate. Constriction arms 132 and 134 completely constrict tubing sections 116 to stop material flow in synchronism with the end of a forward peristaltic cycle. A second pair of constriction arms 136 and 138 function as a draw back control unit. Constriction arms 136 and 138 maintain partial constriction of tubing sections 116 during forward movement of the viscous material. Once forward movement is stopped by way of the flow control gate (constriction arms 132 and 134), the draw back control unit (constriction arms 136 and 138) functions to unconstrict tubing sections 116. The unconstriction permits elastic expansion of tubing sections 116 to thereby draw the viscous material in a reverse direction from nozzles 122. Accordingly, clean deposits of material are output from each of the nozzles 122.

Movable carriage 123 supports flow control unit 120, and is controlled to move horizontally and vertically about travel path 141 by way of carriage control assembly 140. The movement of carriage 123 is timed to coincide with material deposit from the plurality of nozzles 122 onto a movable sheet (not shown). The carriage 123 moves away from body structure 111 along travel path 141 during material release, and the speed of carriage 123 is set to coincide with the speed of the movable sheet. Thus, the material output from each of the nozzles 122 does not slide on the movable sheet during the depositing operation. After the material is ejected from the nozzles 122, the carriage 123 is lifted by carriage control assembly 140 along travel path 141 and returned towards body structure 111 for the next depositing operation. The closeness of the nozzles 122 to the movable sheet during deposition of the material is important for proper product formation. Accordingly, adjusting wheel 142 is provided to fine tune the distance between the lowest point of nozzles 122 and the movable sheet.

Figure 7:
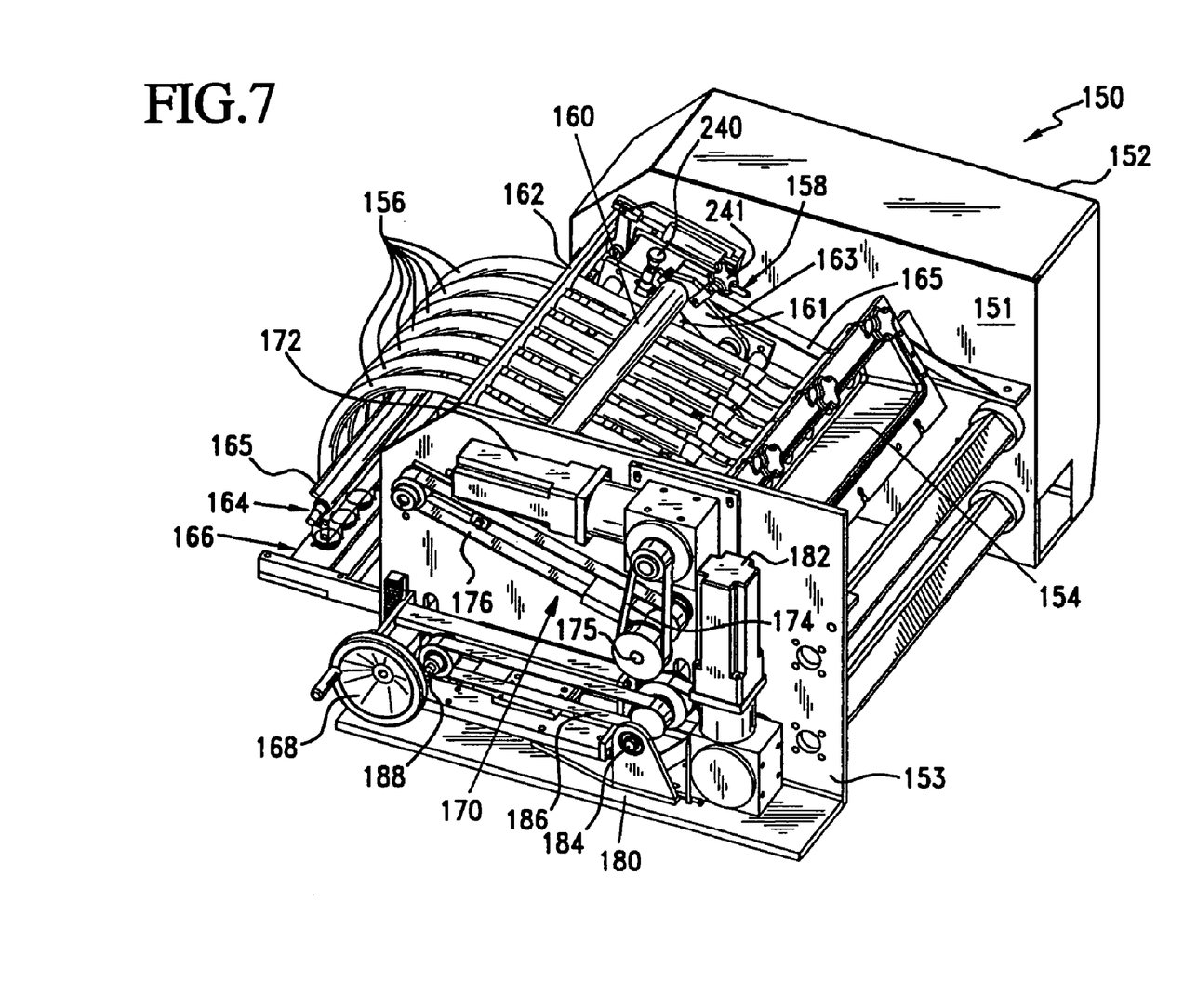
FIG. 7 is an elevated perspective view of a viscous material depositing machine according to another embodiment of the present invention.

FIG. 7 is an elevated perspective view of a viscous material depositing machine 150 according to another embodiment of the present invention. Depositing machine 150 is configured as a plurality of components attached to body structure 152. The body structure 152 includes machine mounting plate 151 and machine mounting plate 153. In practice, body structure 152 resides above a movable sheet (not shown). Depositing machine 150 is illustrated without a hopper or pressurized pump assembly to enhance visualization of interior components.

During operation, viscous material is supplied in a continuous fashion to manifold assembly 154. Material is then divided by manifold assembly 154 into a plurality of flexible tubing sections 156. The tubing sections 156 are elastically deformable and may be made from a variety of materials set forth above. Tubing sections 156 are preferably made from food grade norprene A60F, manufactured by Saint-Gobain Performance Plastics of Wayne, N.J.

Peristaltic unit 158 is formed by way of a combination of primary roller 160, secondary roller 161 and connecting hardware. Each roller follows a respective travel path, as set forth in greater detail above, to provide peristaltic action to tubing sections 156. At the beginning of the travel path, primary roller 160 is moved in a direction toward secondary roller 161 by way of a pivoting rotation of dogleg member 163. Rollers 160 and 161 cooperate to simultaneously constrict all tubing sections 156. Both rollers 160 and 161 are then moved in a forward direction away from manifold assembly 154. At the end of forward travel, dogleg member 163 pivots upwardly to move primary roller 160 in a direction away from secondary roller 161. This allows tubing sections 156 to elastically return to their original shape. Rollers 160 and 161 then move in a reverse direction toward manifold assembly 154 to begin a subsequent peristaltic cycle.

According to the illustrated embodiment, flow control gate 162 is embodied as a bar that completely constricts tubing sections 156 to halt the flow of material. Flow control gate 162 is pivotally attached to machine plates 151 and 153, and control of flow control gate 162 is provided by way of pneumatic actuators (not shown). According to this embodiment, flow control gate 162 is configured as part of body structure 152 and provides an advantage over the embodiment of FIG. 6 in that movable carriage 166 supports less weight.

During forward motion of the viscous material through tubing sections 156, the material flows through draw back control unit 164 and out through a plurality of nozzles (not shown). Draw back control unit 164 includes a pair of constricting arms, which function in accordance with the illustrated embodiment of FIG. 6. However, for ease of illustration in FIG. 7, only a single constricting arm 165 is shown. The constricting arms of draw back control unit 164 are operated by way of pneumatic cylinders (not shown).

Control of peristaltic unit 158 is provided by way of peristaltic transmission unit 170. The peristaltic transmission unit 170 includes servo motor 172, sprocket 175, exterior belt 174 and exterior belt 176. Exterior belt 174 drives sprocket 175 and in turn drives a drive shaft that traverses the interior of body structure 152. Linear drive of peristaltic unit 158 is described in greater detail below with regard to FIGS. 8 and 9. Primary roller 160 and secondary roller 161 not only contact tubing sections 156 during forward linear travel, but are also forced to rotate in synchronism with the forward linear travel.

Primary roller 160 is driven for rotation by a corresponding primary drive belt, set forth in greater detail below. Secondary roller 161 is driven for rotation by secondary drive belt 165. The secondary drive belt 165 is non-continuous and functions as a flexible rack in a rack and pinion system. Secondary drive belt 165 wraps around secondary roller 161 at a first end thereof and is attached at a second end to body structure 152 by way of a tensioner sprocket (not shown). This tensioner sprocket maintains friction contact of secondary drive belt 165 with secondary roller 161. Accordingly, as the peristaltic unit 158 is forced to move linearly in the forward direction, secondary drive belt 165 forces rotation of secondary roller 161. Moreover, the rotational speed of secondary roller 161 is controlled to be in synchronism with the linear travel speed of peristaltic unit 158.

Figure 8:
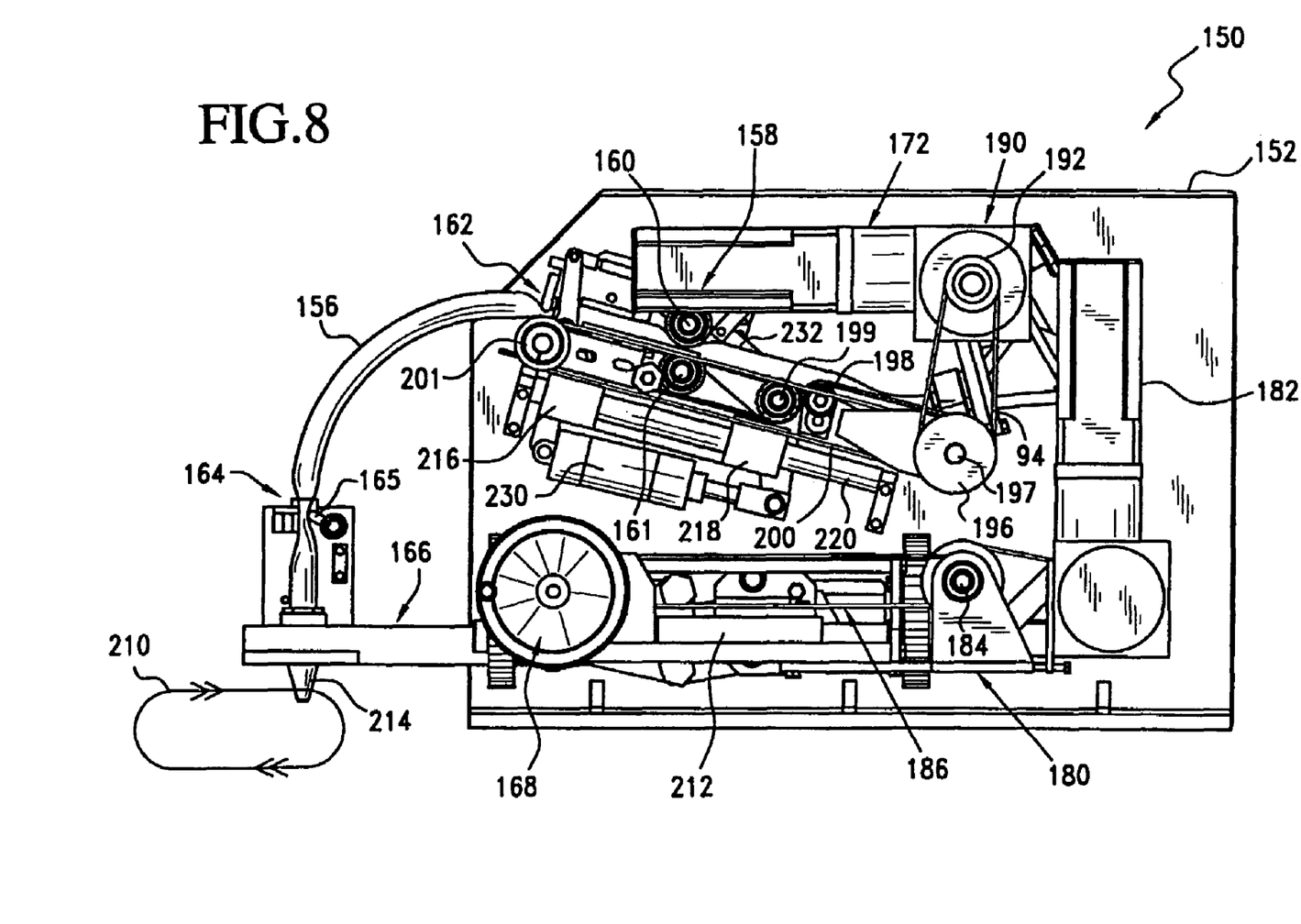
FIG. 8 is a side sectional view of the viscous material depositing machine of FIG. 7.

FIG. 8 is a side sectional view of viscous material depositing machine 150 of FIG. 7. The operation of peristaltic unit 158 is controlled by way of servo motor 172. The servo motor is directly connected to primary belt transmission unit 190, which includes primary sprocket 192, belt 194 and secondary sprocket 196. Primary belt transmission unit 190 connects servo motor 172 to peristaltic unit 158. The primary belt transmission unit 190 rotates secondary sprocket 196 in a back and forth fashion, that is, forward then reverse in accordance with each peristaltic deposit cycle. Belt 200 is a continuous belt that wraps around secondary sprocket 196 and support sprocket 201. Belt 200, in turn, is connected to peristaltic unit 158 by way of first travel member 216 and second travel member 218. Accordingly, linear motion of peristaltic unit 158 is controlled along slide shaft 220 during each peristaltic cycle.

Forced rotation of primary roller 160 presents additional considerations over and above the forced rotation of secondary roller 161 because primary roller 160 pivots. Primary roller 160 is connected to idler sprocket 199 by way of a continuous belt (not shown). Idler sprocket 199 itself is connected to a fixed stud within the peristaltic unit 158. Idler sprocket 199 therefore moves along linear slide rack 220 along with primary roller 160 and secondary roller 161. Idler sprocket 199 is forced to rotate by way of friction contact with belt 198. Belt 198 is non-continuous and is connected at both ends to body structure 152. Belt 198 is in friction contact with idler sprocket 199 to provide rotation thereof during movement of peristaltic unit 158. Belt 198 therefore functions as a flexible rack in a rack and pinion system. As peristaltic unit 158 is forced to linearly travel with respect to linear slide rack 220, idler sprocket 199 also linearly travels and is forced to rotated by way of friction contact with belt 198. As set forth above, idler sprocket 199 applies rotational drive to primary roller 160 by way of a continuous belt (not shown).

Figure 9:
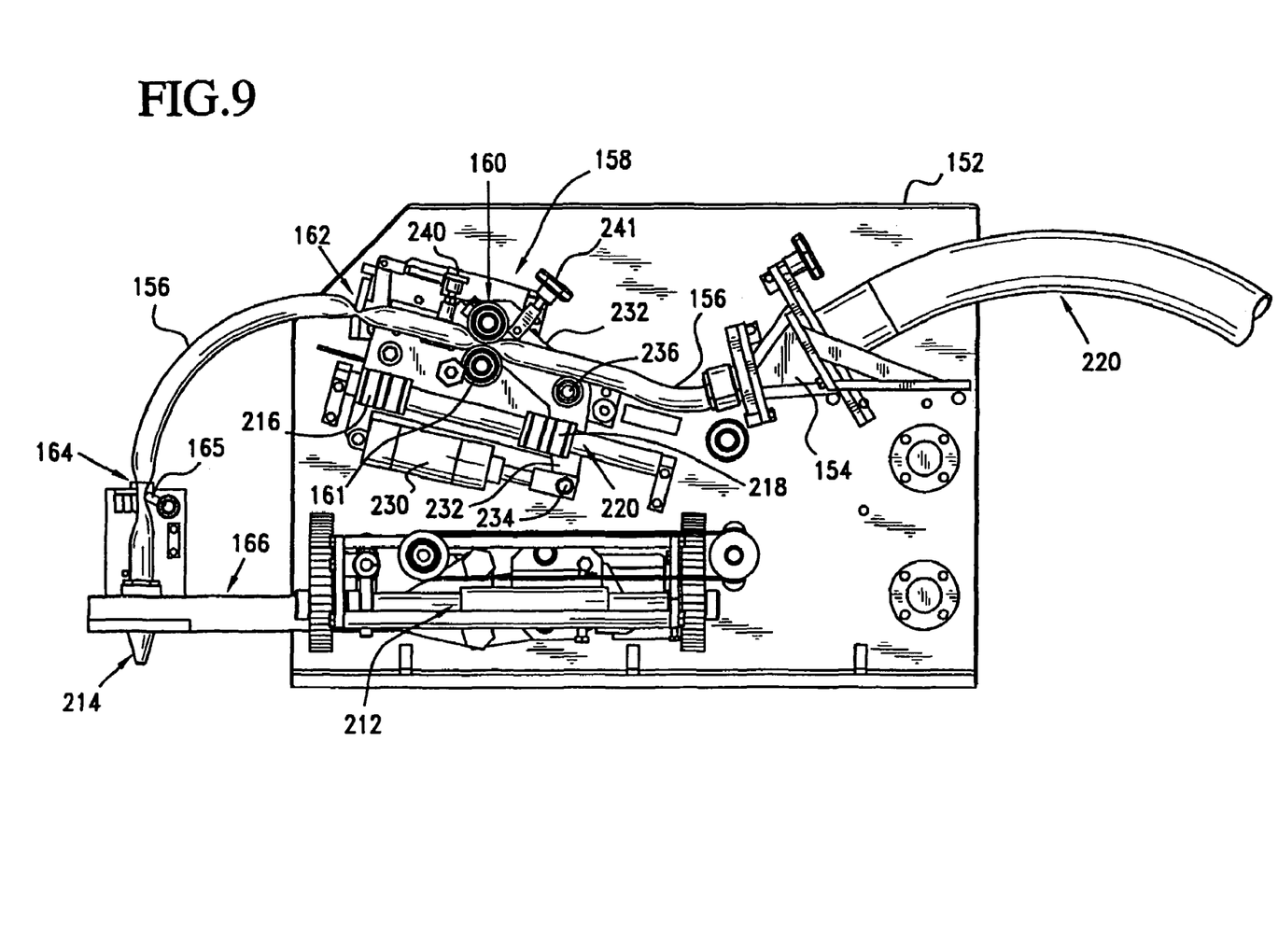
FIG. 9 is another side sectional view of the viscous material depositing machine of FIG. 7.

Carriage 166 moves in horizontal forward and reverse directions by way of linear carriage assembly 180. The linear carriage assembly 180 is controlled by servo motor 182, which is connected to carriage 166 by way of pulley 184, belt 186 and pulley 188 (FIG. 7). Servo motor 182 is operated to control forward motion of carriage 166 in synchronism with deposit of viscous material onto a movable sheet (not shown). At the end of the depositing cycle, carriage 166 is moved rearwardly by servo motor 182 into position for the next depositing operation. FIGS. 7, 8 and 9 particularly illustrates linear carriage assembly 180 for controlling movable carriage 166. Movable carriage 166 is controlled to move in forward and reverse horizontal directions by way of linear carriage assembly 180 and servo motor 182. Moveable carriage 166 moves with respect to linear slide shaft 212.

Nozzles 214 follow travel path 210 by way of horizontal travel of movable carriage 166. Vertical travel of nozzles 214 is provided on carriage 166 itself in response to movement of a pair of pneumatic actuators (not shown). The lowest point of nozzles 214 about travel path 210 is fine tuned by way of adjustment wheel 168. Thus, the fixed vertical height of carriage 166 with respect to the body structure 152 is finely adjusted by adjustment wheel 168. Adjustment is required to accommodate materials of differing viscosities and nozzles of differing sizes. Moreover, adjustment may also be fine tuned during operation of depositing machine 150 once the product depositing operation has begun.

FIG. 9 is another side sectional view of viscous material depositing machine 150 of FIG. 7. As particularly illustrated, manifold assembly 154 is fed viscous material by way of pressurized supply tube 220. Compression cylinder 230 is connected to dogleg member 232 by way of pivot points 234 and 236. Primary roller 160 cooperates with secondary roller 161 to form peristaltic unit 158 and to compresses tubing sections 156 during each peristaltic cycle. Peristaltic unit 158 then travels in a forward direction with respect to linear slide shaft 220. At the end of forward linear travel, primary roller 160 is lifted from tubing sections 156 by dogleg member 232. Peristaltic unit 158, including rollers 160 and 161, then moves in a reverse direction with respect to linear slide shaft 220. The lifting of primary roller 160 allows elastic expansion of tubing sections 156 thereby drawing additional material from manifold assembly 154. For the next peristaltic cycle, primary roller 160 compresses tubing sections 156 with respect to secondary roller 161 in response to actuation of compression cylinder 230. The amount of constriction applied to tubing sections 156 is controlled by adjusting primary roller 160 with adjusting unit 240. Quick release knob 241 is provided for manual removal of primary roller 160 for removal and cleaning of tubing sections 156.

It will be understood by one having ordinary skill in the art and by those who practice the invention, that various modifications and improvements may be made without departing from the spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

What is claimed is:

1. A peristaltic machine, comprising:
    a flexibly deformable tubing section for receiving viscous material;
    a primary roller to cyclically move in a forward direction and a rearward direction about an oval travel path;
    a secondary roller to cyclically move in the forward direction and the rearward direction about a linear travel path,
    wherein the primary roller compresses the tubing section to the secondary roller during a first portion of the oval travel path and does not compress the tubing section during a second portion of the oval travel path.

2. The peristaltic machine according to claim 1, further comprising:
    means connected to a forward portion of the tubing section forward of the primary and second rollers to alternately constrict and unconstrict the forward portion of the tubing section in synchronism with forward movement by the primary and secondary rollers.

3. The peristaltic machine according to claim 2, wherein the constricting means continuously constricts the forward portion of the tubing section to closure until execution of the forward movement by the primary and secondary rollers.

4. The peristaltic machine according to claim 2, wherein the constricting means partially constricts the forward portion of the tubing section during the forward movement by the primary and secondary rollers and unconstricts the tubing section after completion of the forward movement to thereby draw back the viscous material in a reverse direction from an output end of the tubing section.

5. The peristaltic machine according to claim 1, wherein the oval travel path of the primary roller has cambered sides.

6. The peristaltic machine according to claim 1, further comprising:
    a plurality of additional flexibly deformable tubing sections for receiving viscous material, wherein all flexibly deformable tubing sections are connected to a manifold assembly for receiving the viscous material therefrom,
    wherein the primary roller compresses all tubing sections to the secondary roller during the first portion of the oval travel path and does not compress the tubing sections during a second portion of the oval travel path.

7. The peristaltic machine according to claim 6, wherein the primary roller simultaneously compresses all tubing sections to the secondary roller during the first portion of the oval travel path.

8. The peristaltic machine according to claim 1, wherein the secondary roller pivots during the associated cyclical movement.

9. The peristaltic machine according to claim 1, further comprising:
    a body structure; and
    a movable carriage connected to an output end of the tubing section and controlled to move about a predetermined path with respect to the body structure.

10. The peristaltic machine according to claim 9, further comprising:
    a plurality of additional flexibly deformable tubing sections for receiving viscous material, wherein all flexibly deformable tubing sections are connected to a manifold assembly for receiving the viscous material therefrom, wherein said compression means cyclically compresses and releases all of the tubing sections to thereby propagate the viscous material forward.

11. A peristaltic machine, comprising:
- a machine body;
- a flexibly deformable tubing section connected to the machine body and adapted to receive viscous material;
- compression means connected to the machine body for cyclical compression and release of the tubing section and for cyclical propagation of the compression forward to thereby propagate the viscous material forward during a forward peristaltic cycle;
- partial constriction means for maintaining partial constriction of the tubing section during the forward peristaltic cycle and for releasing the partial constriction in synchronism with an end of the forward peristaltic cycle; and
- flow control means for alternately fully constricting and unconstricting the tubing section in synchronism with the forward peristaltic cycle.

12. The peristaltic machine according to claim 11, further comprising:
- a movable carriage connected to an output end of the tubing section and controlled to move about a predetermined path with respect to the machine body.

13. The peristaltic machine according to claim 12, wherein said flow control means is disposed on said movable carriage.

14. The peristaltic machine according to claim 11, wherein said flow control means is disposed on the machine body.

15. A peristaltic machine, comprising:
- a machine body;
- a flexibly deformable tubing section connected to the machine body and configured to receive viscous material at an input end;
- primary and secondary rollers to compress the tubing section and move forward along the tubing section to propagate the viscous material forward;
- a movable carriage supporting an output end of the tubing section and configured to move the output end with respect to the machine body during forward propagation of the viscous material; and
- means disposed on the movable carriage for controlling output of the viscous material from the tubing section.

16. The peristaltic machine according to claim 15, said means for controlling output further comprising:
- a draw back control unit mounted on said carriage and connected rearward of the output end of the tubing section, wherein said draw back control unit partially constricts the tubing section during forward propagation of the material and unconstricts the tubing section after the forward propagation of the material to thereby draw back the viscous material in a reverse direction from the output end of the tubing section.

17. The peristaltic machine according to claim 15, wherein the primary roller cyclically follows a primary roller travel path, the primary roller travel path being oblong with curved ends.

18. The peristaltic machine according to claim 17, wherein the primary roller travel path has a pair of cambered elongated sides each respectively connecting to each of the curved ends.

19. The peristaltic machine according to claim 15, wherein the primary roller cyclically follows a predetermined primary roller travel path.

20. The peristaltic machine according to claim 15, wherein the secondary roller cyclically follows a curvilinear secondary roller travel path.

21. The peristaltic machine according to claim 15, wherein the secondary roller pivots in response to movement of a swing lever.

22. The peristaltic machine according to claim 15, further comprising:
- a plurality of additional flexibly deformable tubing sections configured at respective input ends thereof for receiving viscous material, wherein all flexibly deformable tubing sections are connected at the respective input ends to a manifold assembly for receiving the viscous material therefrom,
- wherein the primary roller follows a primary roller travel path and the secondary roller follows a secondary roller travel path.

* * * * *